(12) United States Patent
Li et al.

(10) Patent No.: US 8,278,391 B2
(45) Date of Patent: Oct. 2, 2012

(54) POLYPROPYLENE COMPOSITIONS FOR ORIENTED FILMS

(75) Inventors: Fengkui Li, Houston, TX (US); Ryan Albores, Pearland, TX (US); John Ashbaugh, Houston, TX (US); Luyi Sun, Pearland, TX (US)

(73) Assignee: Fina Technology, Inc., Houston, TX (US)

( * ) Notice: Subject to any disclaimer, the term of this patent is extended or adjusted under 35 U.S.C. 154(b) by 72 days.

(21) Appl. No.: 12/817,275

(22) Filed: Jun. 17, 2010

(65) Prior Publication Data

US 2011/0313104 A1  Dec. 22, 2011

(51) Int. Cl.
*C08F 8/00* (2006.01)
*C08F 214/26* (2006.01)
*C08L 23/00* (2006.01)
*C08L 27/12* (2006.01)

(52) U.S. Cl. ......... 525/191; 525/199; 525/200; 525/240

(58) Field of Classification Search .................. 525/191, 525/199, 200, 240
See application file for complete search history.

(56) References Cited

U.S. PATENT DOCUMENTS

| | | |
|---|---|---|
| 6,734,252 B1 | 5/2004 | Woods |
| 2001/0039314 A1 | 11/2001 | Mehta et al. |
| 2003/0040577 A1 | 2/2003 | Niyogi |
| 2005/0158475 A1 | 7/2005 | Bell et al. |
| 2006/0247379 A1 | 11/2006 | Patel et al. |
| 2008/0097034 A1 | 4/2008 | Ho et al. |
| 2008/0205800 A1 | 8/2008 | Su et al. |

FOREIGN PATENT DOCUMENTS

JP 08176366 A 7/1996

*Primary Examiner* — Nathan M Nutter

(57) ABSTRACT

Oriented films and methods of forming the same are discussed herein. The oriented films generally include a propylene based polymer and an additive selected from fluoropolymers, fluoroelastomers and combinations thereof, wherein the additive is present in an amount of from about 50 ppm to about 20,000 ppm.

21 Claims, 1 Drawing Sheet

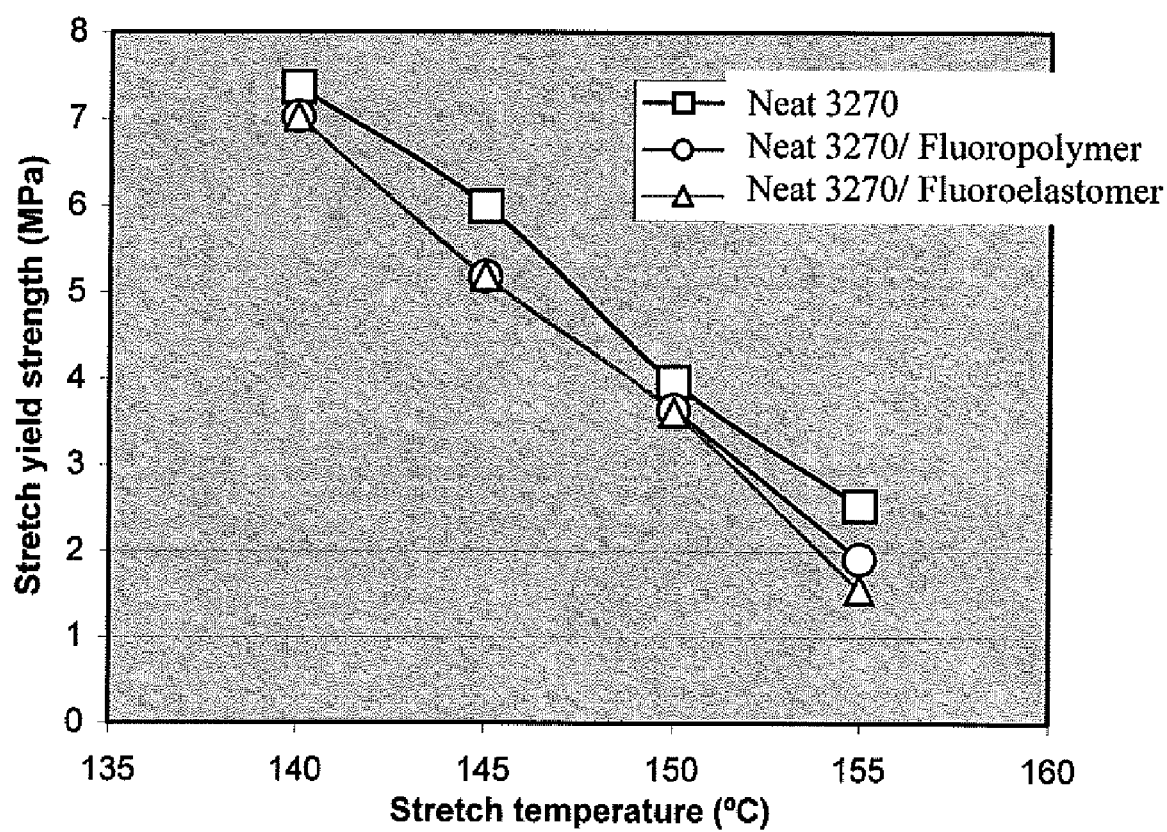

POLYPROPYLENE COMPOSITIONS FOR ORIENTED FILMS

FIELD

Embodiments of the present invention generally relate to olefin based polymer films and, more particularly, to oriented polypropylene films. Even more particularly, embodiments relate to the use of modifiers containing fluorine to improve orientation processing of polypropylene films.

BACKGROUND

As reflected in the patent literature, biaxial orientation of polyolefins produces films having applications in, for example, snack food packaging, cigarette overwrap, shrink film, electronic components wrapping, packaging tape, pressure sensitive tapes, labels, capacitor films, audio/video cassettes & CD overwrap, cable insulation and others. The polyolefins which may be employed in the preparation of biaxially oriented films include isotactic polypropylene homopolymers with high stereoregularity, although on some occasions the use of syndiotactic polymers has been proposed. Also suitable are co-polymers of isotactic polypropylenes with a small content of ethylene (mini-random co-polymers).

Biaxial polypropylene films have found wide acceptance in the packaging industry because of their superior physical properties such as high tensile strength, stiffness, optical clarity, gloss, and even a certain degree of moisture and oxygen resistance. Isotactic polypropylene homopolymers with higher stereoregularity not only possess enhanced mechanical properties, but also impart superior moisture barrier properties desirable especially for packaging industry. However, high isotacticity polypropylene materials are relatively more difficult to process for bi-axial stretching due to their high degree of crystallinity, and thus limiting oriented film productivity and quality. Manufacturers continue to develop polymer formulations that can be stretched more easily, which could translate into improved manufacturing efficiency as a result of factors such as decreased energy consumption and increased line speed. While many solutions have been proposed in the art to overcome the processing issue, such solutions often compromise the physical properties.

Therefore, it would be desirable to develop polymeric compositions that retain user-desired mechanical and/or physical properties while having an ease of processing.

SUMMARY

Embodiments of the present invention include oriented films. The oriented films generally include an olefin based polymer and an additive selected from fluoropolymers, fluoroelastomers and combinations thereof, wherein the additive is present in an amount of from about 50 ppm to about 20,000 ppm.

One or more embodiments include the film of the preceding paragraph, wherein the olefin based polymer is a propylene based polymer.

One or more embodiments include the film of any preceding paragraph, wherein the oriented film is either monoaxially or biaxially oriented.

One or more embodiments include the film of any preceding paragraph, wherein the polypropylene based polymer includes a propylene homopolymer.

One or more embodiments include the film of any preceding paragraph, wherein the polypropylene based polymer is an isotactic polypropylene homopolymer having a mmmm % of at least 90%.

One or more embodiments include the film of any preceding paragraph, wherein the polypropylene based polymer includes ethylene in an amount of from about 0.0 wt. % to about 5.0 wt. %.

One or more embodiments include the film of any preceding paragraph, wherein the additive is present in an amount of from about 250 ppm to about 5,000 ppm.

One or more embodiments include the film of any preceding paragraph, wherein the presence of the additive reduces a stretching force during film formation by at least 5% as compared to the same propylene based polymer absent the additive.

One or more embodiments include the film of any preceding paragraph, wherein the film exhibits a tensile strength at break of at least about 25,000 psi.

One or more embodiments include the film of any preceding paragraph, wherein the film exhibits an elongation at break at least about 45%.

One or more embodiments include the film of any preceding paragraph, wherein the film exhibits an oxygen vapor transmission rate of from about 200 to about 300 cc/100 in$^2$/day.

One or more embodiments include the film of any preceding paragraph, wherein the film exhibits a water vapor transmission rate of from about 0.6 to about 1.0 gm/100 in$^2$/day.

One or more embodiments include the film of any preceding paragraph, wherein the propylene based polymer exhibits a melt flow rate of from about 0.05 dg/min. to about 10 dg/min.

One or more embodiments include methods of forming the film of any preceding paragraph. The methods generally include providing a propylene based polymer exhibiting a crystallinity of at least about 95%; blending the propylene based polymer with an additive selected from selected from fluoropolymers, fluoroelastomers and combinations thereof to form a modified polymer; and forming the modified polymer into a film.

One or more embodiments include a biaxially oriented film including a propylene based polymer exhibiting a mmmm % of at least 95%; and from about 50 ppm to about 20,000 ppm of an additive selected from fluoropolymers, fluoroelastomers and combinations thereof, wherein the presence of the additive reduces the stretching force during film processing from about 5% to about 40% as compared to the same propylene based polymer absent the additive.

One or more embodiment generally include thermoformed articles. The thermoformed articles generally include an olefin based polymer and an additive selected from fluoropolymers, fluoroelastomers and combinations thereof, wherein the additive is present in an amount of from about 50 ppm to about 20,000 ppm.

BRIEF DESCRIPTION OF DRAWINGS

FIG. 1 illustrates machine direction stretch yield strengths as a function of stretching temperature of various films.

DETAILED DESCRIPTION

A detailed description will now be provided. Each of the appended claims defines a separate invention, which for infringement purposes is recognized as including equivalents to the various elements or limitations specified in the claims.

Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are defined below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments of the invention include contacting olefin based polymers (hereinafter referred to interchangeable with the term "polyolefin") with an additive to improve film processing.

Catalyst Systems

Catalyst systems useful for polymerizing olefin monomers and forming olefin based polymers include any suitable catalyst system. For example, the catalyst system may include chromium based catalyst systems, single site transition metal catalyst systems including metallocene catalyst systems, Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, 4-methyl-1-pentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzycyclobutane, styrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any suitable method, such as via a double jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

In one or more embodiments, the polymer may contain suitable additives containing fluorine elements for extrusion. Suitable additives containing fluorine generally include fluoropolymers, fluoroelastomers and combinations thereof. Examples of suitable fluoropolymers include, but are not limited to, polyvinylidinefluorides, such as SOLEF® 11010/1001, commercially available from Solvay Solexis. Examples of suitable fluoroelastomers (i.e., amorphous fluoropolymers) include, but are not limited to copolymers of vinylidene fluoride and hexafluoropropylene, such as Tecnoflon® NM, commercially available from Solvay Solexis.

The quantities of fluoropolymer and/or fluoroelastomer utilized enable incorporation of fluoropolymer and/or fluoroelastomer additives in polymer formulations while maintaining the desirable physical/mechanical and optical properties of the polymer. However, in one or more embodiments the modified polymer includes from about 50 ppm to about 200,000 ppm, or from about 100 ppm to about 150,000 or from about 250 ppm to about 100,000 ppm of the additive containing fluorine, for example.

Contact may occur via methods known in the art, such as blending, for example. Such blending may include dry blending, extrusion, mixing or combinations thereof, for example. Although the additive may be blended with the polymer, a degree of immiscibility of the additive may cause the additive to be present in the polymer as dispersed droplets. It has been found that the presence of small amounts of these additives eases orientation of such polymer at a relatively lower stretching force.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene and polypropylene copolymers, for example.

Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. % or at least about 90 wt. % polypropylene relative to the total weight of polymer, for example.

The propylene based polymers may have a molecular weight distribution ($M_n/M_w$) of from about 1.0 to about 20, or from about 1.5 to about 15 or from about 2 to about 12, for example.

The propylene based polymers may have a melt flow rate (MFR) (as measured by ASTM D-1238) of from about 0.01 dg/min to about 1000 dg/min., or from about 0.01 dg/min. to about 100 dg/min. or from about 0.05 dg/min. to about 10 dg/min., for example.

In one or more embodiments, the polymers include polypropylene homopolymers. Unless otherwise specified, the term "polypropylene homopolymer" refers to propylene homopolymers or those polymers composed primarily of propylene and amounts of other comonomers, wherein the amount of comonomer is insufficient to change the crystalline nature of the propylene polymer significantly.

In one or more embodiments, the polymers include propylene based random copolymers. Unless otherwise specified, the term "propylene based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt. % to about 5.0 wt. %, or from about 0.6 wt. % to about 1.0 wt. % comonomer relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof. In one specific embodiment, the comonomer includes ethylene. Further, the term "random copolymer" refers to a copolymer formed of macromolecules in which the probability of finding a given monomeric unit at any given site in the chain is independent of the nature of the adjacent units.

The propylene based random copolymers may exhibit a melt flow rate of at least about 0.01 dg/min to about 100 dg/min., or from about 5 dg/10 min. to about 30 dg/10 min. or from about 10 DG/10 min. to about 20 dg/10 min., for example.

In one or more embodiments, the propylene based polymers include stereospecific polymers. As used herein, the term "stereospecific polymer" refers to a polymer having a defined arrangement of molecules in space, such as isotactic and syndiotactic polypropylene, for example. The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

In one or more embodiments, the polymers include isotactic polypropylene. As used herein, the term "isotactic polypropylene" refers to polypropylene having an isotacticity measured by $^{13}C$ NMR spectroscopy using meso pentads (e.g., % mmmm) of greater than at least about 60%, or at least about 70%, or at least about 80%, or at least about 85%, or at least about 90%, or at least about 95% or at least about 98%, for example.

The isotactic polypropylene may have a melting point ($T_m$) (as measured by DSC) of from about 130° C. to about 175° C., or from about 140° C. to about 170° C. or from about 150° C. to about 165° C., for example. The isotactic polypropylene may have a molecular weight ($M_w$) (as measured by gel permeation chromatography) of from about 2,000 to about 1,000,000 or from about 100,000 to about 800,000, for example.

In one or more embodiments, the isotactic polypropylene may have a xylene soluble (XS) content of less than 7.0 wt. %, or less than 5.0 wt. %, or less than 3.0 wt. %, or less than 1.0 wt. %, for example. Methods for determination of the XS % are known in the art, for example the XS % may be determined in accordance with ASTM D 5492-98. Typically, the XS % in the polymer is indicative of the extent of crystalline polymer formed. In determining the xylene soluble fraction (XS %), the polymer is dissolved in boiling xylene and then the solution cooled to 0° C. which results in the precipitation of the isotactic or crystalline portion of the polymer. The XS % is that portion of the original amount that remained soluble in the cold xylene.

It is to be recognized that the polymer properties recited herein are those of the polymer prior to modification with the additive containing fluorine. Such modification may provide for alteration of polymer properties. For example, the melt flow rate of the modified polymer may vary from that of the unmodified polymer.

Product Application

The polymer formulations and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example One or more embodiments of the invention include utilizing the modified polymer in solid state stretching applications, such as thermoforming, drawn tape, drawn monofilament, mono direction (monoaxially) oriented film, biaxially oriented film, solid state extrusion and injection stretch blow molding, for example.

Typically, solid state stretching of films may be performed in a tentering machine. For example, the modified polymer may be extruded into a sheet. Next, a tentering process may be utilized to stretch the sheet in one direction to form a monoaxially oriented film or in two directions to form a biaxially oriented film. Such processes generally include heating prior to stretching, for example.

The oriented films may have a desired sheet thickness dependent upon the particular application. However, for most applications, a suitable film thickness may range from about 0.5 mils to about 50 mils, or from about 2 mils to about 30 mils, or from about 10 mils to about 25 mils, for example.

The lower inherent coefficient of friction imparted by the presence of the additive containing fluorine in the modified polymer results in a reduction of the requisite stretching force to stretch the film. In one or more embodiments, the presence of the additive reduces the stretching force by at least about 5%, or from about 5% to about 60%, or from about 5% to about 40% as compared to the same polymer formulation without the presence of the additive(s). This reduction is of importance in that decreasing the requisite stretching force advantageously increases both productivity and film quality of oriented films in commercial production lines.

Perhaps most notably, the films maintain the desirable physical and optical properties imparted by the polymer (e.g., tensile strength, elongation, secant modulus, oxygen and water vapor transmission rates, haze, and gloss) at such reduced stretching force.

In one or more embodiments, the oriented film has a tensile strength at break equal to or greater than about 25,000 psi, for example. In one or more embodiments, the oriented film has an elongation at break equal to or greater than about 45%, for example. In one or more embodiments, the oriented film may also have a 1% secant modulus (transverse direction), as determined by ASTM D882, of from about 150 kpsi to about 500 kpsi, or from about 200 kpsi to about 400 kpsi, or from about 250 kpsi to about 350 kpsi, for example.

In one or more embodiments, the oriented film has an oxygen transmission rate of from about 200 to about 300 cc/100 in$^2$/day, for example. In one or more embodiments, the oriented film may have a water vapor transmission rate (WVTR), as determined by ASTM F1249, of from 0.5 gm/100 in$^2$/day to about 2.0 gm/100 in$^2$/day, or from about 0.6 gm/100 in$^2$/day to 1.0 gm/100 in$^2$/day, for example.

In one or more embodiments, the oriented film may have a haze, as determined using ASTM 1003, of less than or equal to about 10%, or less than or equal to about 5%, or less than or equal to about 1%, for example. In one or more embodiments, the oriented film has a 45° gloss, as determined using ASTM D523, of from 10 to about 150, or from 20 to about 125, or from about 25 to about 110, for example.

Examples

The following examples are for illustration purposes only, and are not intended to be limiting.

Three polypropylene samples were prepared to demonstrate the effect of the fluoropolymer and fluoroelastomer additives on the stretching force required during the formation of biaxially oriented polypropylene films. The first sample is commercially available neat Total Petrochemicals 3270 ("neat 3270"), referred to herein as the reference sample, which comprises a highly crystalline polypropylene. The second and third samples were prepared by blending the fluoropolymer and fluoroelastomer additives, respectively, to the same polypropylene (neat Total Petrochemicals 3270). The second sample contained 500 ppm of fluoropolymer SOLEF® 11010/1001 and the third sample had 500 ppm of fluoroelastomer Tecnoflon® NM. Table 1 shows some of the properties of the formed polymer pellets for each sample.

TABLE 1

|  | Neat 3270 (reference) | Neat 3270 with 500 ppm Fluoropolymer | Neat 3270 with 500 ppm Fluoroelastomer |
|---|---|---|---|
| MFR [dg/min] | 3.2 | 63 | 5.7 |
| re-crystallization T (° C.) | 117.5 | 117.0 | 116.5 |
| $\Delta H_c$ (J/g) | 109.9 | 111.9 | 104.1 |
| melting Temperature (° C.) | 165.7 | 165.2 | 165.7 |
| $\Delta H_m$ (J/g) | 118.8 | 121.0 | 115.0 |

It should be noted that although the addition of fluoropolymer and fluoroelastomer demonstrates a significant rise in the melt flow rate (MFR), the rise is understood to be due to the fluoropolymer and fluoroelastomer forming a thin layer along the capillary wall during the melt flow measurements, which results in a higher apparent MFR. The polypropylene molecular weights are very unlikely to change so significantly due to the presence of fluoropolymer and fluoroelastomer.

Each of the pellet materials were cast into 16 mil sheets and then evaluated for biaxial orientation using a Bruckner Kara IV stretching machine. The samples were stretched to biaxially orient the films at four oven temperatures ranging from 140° C. to 155° C. FIG. 1 shows the machine direction (MD) stretch yield strengths as a function of stretching temperature for each of the stretched films. As shown in FIG. 1, the presence of 500 ppm fluoropolymer or fluoroelastomer lowers the polypropylene stretching force by about 5% to about 40% depending upon the stretching temperature. It is believed that a lower stretching force (stretch yield strength) is required due to the presence of fluoropolymer or fluoroelastomer between polypropylene crystals which lowers the inherent coefficient of friction of the second and third sample films. This understanding is also supported by DSC first melt measurements of the three samples exhibiting an insignificant difference over temperature, indicating that a difference in crystal melting, if any, at the various temperatures ranging from 140° C. to 155° C. does not contribute to the lower stretching force.

The biaxially oriented films produced at a stretching temperature of 140° C. were characterized for physical, optical and barrier properties. The film properties of haze, gloss, 1% secant modulus, tensile strength, elongation, shrinkage in both the machine direction (MD) and the transverse direction (TD), oxygen transmission rate (O2TR), and water vapor transmission rate for each of these films are listed in Table 2.

TABLE 2

|  | Neat 3270 (reference) | Neat 3270 with 500 ppm Fluoropolymer | Neat 3270 with 500 ppm Fluroelastomer |
| --- | --- | --- | --- |
| haze [%] | 0.8 | 0.9 | 1.0 |
| gloss 45° | 91.5 | 90.1 | 90.2 |
| 1% secant modulus [kpsi] | 330 | 326 | 339 |
| tensile strength at yield/break [psi] | 31,360 | 26,534 | 31,466 |
| elongation at yield/break [psi] | 77 | 46 | 80 |
| shrinkage MD/TD [%] | 5.9/5.4 | 5.4/5.9 | 5.4/5.9 |
| O2TR [cc/100 in$^2$/day] | 261 | 246 | 285 |
| WVTR [gm/100 in$^2$/day] | 0.73 | 0.71 | 0.67 |

A comparison of haze and gloss measurements shown in Table 2 demonstrates that the fluoropolymer and fluoroelastomer containing films possess comparable or very small differences in the optical properties as compared to the polypropylene reference film. Also notable is the fluoroelastomer containing film demonstrates the best performance in that the mechanical properties are retained, and the moisture barrier (WVTR) properties are even slightly improved, as compared to the polypropylene reference film.

While the foregoing is directed to embodiments of the present invention, other and further embodiments of the invention may be devised without departing from the basic scope thereof and the scope thereof is determined by the claims that follow.

What is claimed is:

1. An oriented film comprising an olefin based polymer and an additive selected from fluoropolymers, fluoroelastomers and combinations thereof, wherein the additive is present in an amount of from about 50 ppm to about 20,000 ppm, wherein the oriented film has a haze of less than or equal to about 10%, as measured by ASTM 1003.

2. The film of claim 1, wherein the olefin based polymer is a propylene based polymer.

3. The film of claim 1, wherein the oriented film is either monoaxially or biaxially oriented.

4. The film of claim 1, wherein the olefin based polymer comprises a propylene homopolymer.

5. The film of claim 2, wherein the polypropylene based polymer is an isotactic polypropylene homopolymer having a mmmm % of at least 90%.

6. The film of claim 2, wherein the polypropylene based polymer comprises ethylene in an amount of from about 0.0 wt. % to about 5.0 wt. %.

7. The film of claim 1, wherein the additive is present in an amount of from about 250 ppm to about 5,000 ppm.

8. The film of claim 1, wherein the presence of the additive reduces a stretching force during film formation by at least 5% as compared to the same propylene based polymer absent the additive.

9. The film of claim 1 exhibiting a tensile strength at break of at least about 25,000 psi.

10. The film of claim 1 exhibiting an elongation at break of at least about 45%.

11. The film of claim 1 exhibiting an oxygen vapor transmission rate of from about 200 to about 300 cc/100 in$^2$/day.

12. The film of claim 1 exhibiting water vapor transmission rate of from about 0.6 to about 1.0 gm/100 in$^2$/day.

13. The film of claim 2, wherein the propylene based polymer exhibits a melt flow rate of from about 0.05 dg/min, to about 10 dg/min.

14. The film of claim 1, wherein the film has a haze of less than or equal to 1%, as determined by ASTM 1003.

15. The film of claim 1, wherein the film has an oriented 45° gloss, as measured by ASTM D523, of from about 10 to about 150.

16. The film of claim 15, wherein the film has an oriented 45° gloss, as measured by ASTM D523, of from about 25 to about 110.

17. An oriented film comprising an olefin based polymer and an additive selected from fluoropolymers, fluoroelastomers and combinations thereof, wherein the oriented film has a haze of less than or equal to about 10%, as measured by ASTM 1003.

18. The film of claim 17, wherein the film has an oriented 45° gloss, as measured by ASTM D523, of from about 10 to about 150.

19. The film of claim 17, wherein the olefin based polymer is a propylene based polymer.

20. The film of claim 17, wherein the oriented film is either monoaxially or biaxially oriented.

21. The film of claim 17 exhibiting a tensile strength at break of at least about 25,000 psi.

* * * * *